United States Patent [19]

Richards

[11] Patent Number: 4,573,652
[45] Date of Patent: Mar. 4, 1986

[54] SUPPORT SYSTEM FOR MARITIME OR OTHER USE

[75] Inventor: Peter S. Richards, King County, Wash.

[73] Assignee: Progressive Fastening, Inc., Issaquah, Wash.

[21] Appl. No.: 464,208

[22] Filed: Feb. 7, 1983

[51] Int. Cl.$^4$ ............................................. F16L 3/08
[52] U.S. Cl. ........................................ 248/74.1; 248/62
[58] Field of Search .................. 248/74.1, 74.2, 59, 248/62, 63, 65, 73, 58; 256/DIG. 6; 411/378

[56] References Cited

U.S. PATENT DOCUMENTS

| | | | |
|---|---|---|---|
| 1,013,187 | 1/1912 | Lofton et al. | 248/62 |
| 1,457,106 | 5/1923 | Estep . | |
| 1,462,187 | 7/1923 | Zifferer . | |
| 1,850,275 | 3/1932 | Zifferer | 248/59 |
| 1,898,898 | 2/1933 | Rowley | 248/59 |
| 2,166,916 | 7/1939 | Lombard . | |
| 2,762,598 | 9/1956 | Runge | 248/59 |
| 3,034,753 | 5/1962 | Johnson et al. . | |
| 3,066,903 | 12/1962 | Tinnerman . | |
| 3,198,463 | 8/1965 | Loudon . | |
| 3,353,775 | 11/1967 | Sebo . | |
| 3,506,227 | 4/1970 | Jenkins | 248/59 |
| 3,523,668 | 8/1970 | Logsdon . | |
| 3,559,910 | 2/1971 | Babb | 248/74.5 |
| 3,563,131 | 2/1971 | Ridley | 248/73 |
| 3,575,367 | 4/1971 | Bodine et al. . | |
| 3,576,305 | 4/1971 | Welsh et al. | 248/62 |
| 3,923,277 | 12/1975 | Perrault . | |
| 3,942,750 | 3/1976 | Noorily . | |
| 3,966,154 | 6/1976 | Perrault . | |
| 3,980,263 | 9/1976 | Okuda . | |
| 4,013,253 | 3/1977 | Perrault . | |
| 4,032,096 | 6/1977 | Perrault . | |
| 4,039,131 | 8/1977 | Perrault . | |
| 4,078,752 | 3/1978 | Kindorf . | |
| 4,170,995 | 10/1979 | Levine et al. | 248/74.1 |

Primary Examiner—Ramon S. Britts
Assistant Examiner—Ramon O. Ramirez
Attorney, Agent, or Firm—Seed and Berry

[57] ABSTRACT

Disclosed herein are improved support systems for electrical cabling, piping, and the like for fast-on, fast-off, non-twist connection to spaced studs projecting from a support wall, bulkhead, etc. Three embodiments are disclosed, one of which uses coupling nuts having on one end an internally threaded bore to mate with threads on the stud, and on the other end, an integral stud extension having external reverse threads which mate with a threaded socket member secured to a clamp assembly. Other embodiments utilize means for rigidly securing the cabling, piping, or the like to spaced studs supported from a support member. A unique means is also disclosed for clamping the material, such as cabling, piping, or the like, in place.

2 Claims, 5 Drawing Figures

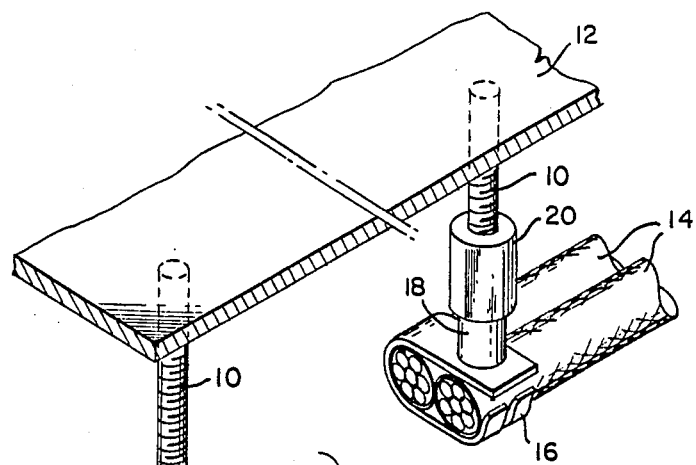
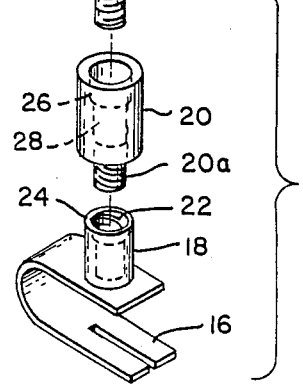
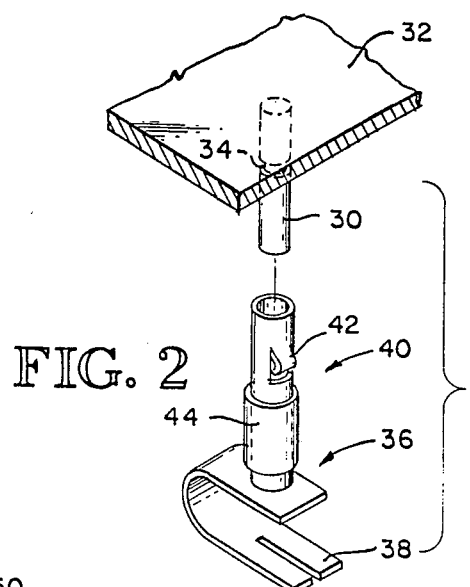
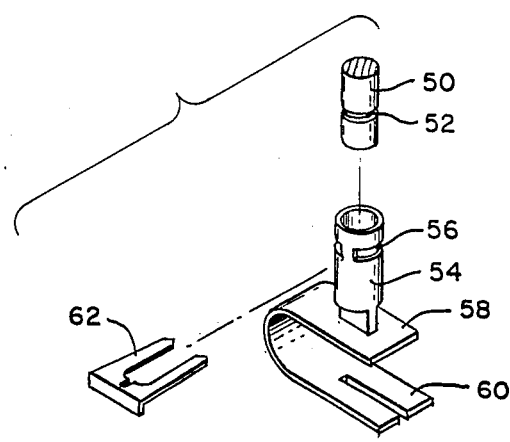
FIG. 1
FIG. 2
FIG. 3

SUPPORT SYSTEM FOR MARITIME OR OTHER USE

DESCRIPTION

1. Technical Field

This invention relates to hanger assemblies for supporting electrical or communication cables, piping, etc., at spaced locations along their lengths, particularly for supporting such in ships, underground utility trenches, buildings, etc.

2. Background Art

Hanger assemblies, particularly those employed in the ship building industry, must meet certain rigid specifications, including (1) sufficient flexural strength to support the piping or cabling carried by the assemblies, (2) quick and economical assembly of the hanger assemblies, and (3) quick and easy disassembly of the assemblies when repairs or replacement must be made.

Numerous patents disclose various types of hanger assemblies for many different uses. U.S. Pat. No. 3,575,367 discloses a hollow standoff hanger assembly secured over a projecting stud, the standoff secured in a number of different ways. U.S. Pat. No. 1,462,187 discloses an adjustable flange adapted to be secured adjacent a ceiling or wall from which a rod or bolt extends for supporting purposes. U.S. Pat. Nos. 4,013,253; 4,032,096; and 4,039,131 disclose bracket supports for supporting electrical cabling in the electrical systems of ships, underground utility trenches, etc. U.S. Pat. No. 3,966,154 discloses a cable hanger utilizing an adjustable strap to support cabling. U.S. Pat. Nos. 3,066,903; 2,166,916; 3,198,463; 3,523,668; 3,353,775; 3,980,263; 3,942,750; 4,078,752; 3,034,753; 1,457,106; and 3,923,277 also disclose various kinds of hangers for cabling, piping, and the like.

DISCLOSURE OF INVENTION

The present provides an improved support system for electrical cabling, piping, or the like for use in the ship building industry or elsewhere which can be quickly and economically connected or disconnected to spaced studs projecting from a support wall member, bulkhead, etc. One embodiment of the invention employs coupling nuts having an internally threaded bore at one end to mate with threads on the stud, and, at the other end, an integral stud extension having reverse threads from the internally threaded bore portion which mate with a threaded socket secured to a unique hanger/clamp member for clamping the cabling, piping, or the like. A second embodiment utilizes an elongated hollow annular member which fits over the stud and is secured to the stud securely, yet is removable when necessary. A third embodiment utilizes a hollow annular member having a resilient finger projecting into the interior thereof. The annular member is fitted over a stud having a groove therein into which the finger projects to hold the member in place.

BRIEF DESCRIPTION OF THE DRAWINGS

FIG. 1 is an exploded perspective view of the preferred embodiment of this invention;

FIG. 2 is an exploded perspective view of a second embodiment;

FIG. 3 is an exploded perspective view of a third embodiment; and

FIG. 4 is a perspective view of an improved clamp member for securing pipe, cabling or the like.

BEST MODE FOR CARRYING OUT THE INVENTION

Figure 4:
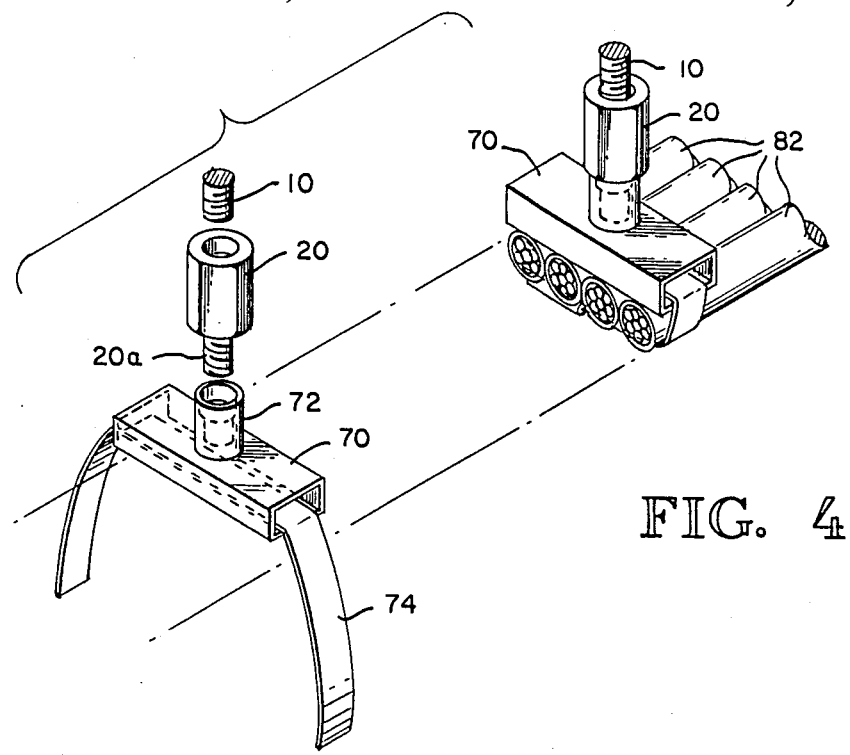

The improved systems described in this application eliminate the traditional requirement that the cables, piping, etc., must be removed from the hanger assembly before the hanger assembly may be threaded onto, or off of, spaced studs secured to a bulkhead or support member. The systems described eliminate the twisting requirement so that the cables, piping, etc., are maintained in their captured configuration in the hanger body even when the hanger is temporarily removed from the spaced studs. These benefits result in a considerable reduction in both assembly time and materials cost for not only the initial installation but for all subsequent removal and replacement cycles.

Referring to FIG. 1, threaded studs 10 are welded at spaced intervals to a supporting member 12, such as a bulkhead or a side or top wall of a utility trench, building, or the like. Cabling 14 or other items to be supported from the supporting member 12 is placed between the bendable legs of a saddle 16, to which is secured an integral socket 18 having an internally threaded bore.

The socket 18 and saddle clamp 16 are secured to the projecting studs 10 by respective coupling nuts 20. Each coupling nut has an internally threaded bore portion whose threads mate with the threads on the stud 10, and an integral, externally threaded stud extension 20a having reverse threads from those of the internal bore of the coupling nut 20. Sufficient space 26 is left between the top of the internally threaded bore portion and the start of the threads 28 to align the coupling nut with the threads of the stud 10 to enable it to be easily threaded onto the stud. In the same manner, sufficient space 24 is left between the top of the socket 18 and the beginning of the internal threads 22 of the socket to provide alignment of the threads of the socket with those of the stud extension 20a of the coupling nut for fast and easy securement thereto.

The exterior of the internally threaded bore portion of the coupling nut 20 may be in the form of a hexagon or other configuration to allow fast and easy removal with the fingers or with suitable tools.

A second embodiment of a hanger assembly is shown in FIG. 2. An annular grooved stud 30 is welded or otherwise secured to a bulkhead or support member 32. The stud includes a groove 34 near the upper end thereof. A hanger includes saddle clamp 36 having bendable legs 38 secured to an annular hollow member 40 at one end, the member having an internal diameter to allow it to fit closely over the stud 30. The sidewall of the member 40 includes an integral resilient finger 42, one end of which projects into the interior of the member 40. When the member 40 is pressed over the stud 30, the resilient finger 42 catches in the groove 34 formed near the upper end of the stud 40 to retain the member 40 and saddle clamp 36 in place. An annular retaining ring 44 surrounding the hollow member 40 is pushed over the resilient finger 42 to retain the free end of the finger in place in the groove 34 of the stud 30 so that force exerted on the member 40 and saddle clamp 36 will not disengage the finger 42 from the groove.

The third embodiment is illustrated by FIG. 3. In this embodiment, stud 50, projecting from a bulkhead or support member includes a groove 52 therein near its free end. A hanger includes an elongated hollow member 54 having an internal diameter adapted to closely fit over the stud 50 with slots 56 therein on one or both sides, as illustrated. The hollow member 54 is connected at one end to a saddle clamp 58 having bendable legs 60 for securing around cabling, piping, or the like. Cabling or piping is supported from the support by the clamp 58 by slipping the hollow member 54 over the stud 50 until the slots 56 in the hollow member match with the grooves 52 in the stud. A forked retaining clip 62 is then forced into place, as illustrated, to retain the member 54 in place over the stud 50. The retaining clip 62 may be removed when necessary for disassembly.

The three embodiments disclosed provide a fast-on, fast-off, non-twist support method for cabling and piping systems. These embodiments provide sufficient flexural strength to support piping or cabling carried by the assemblies.

Figure 5:
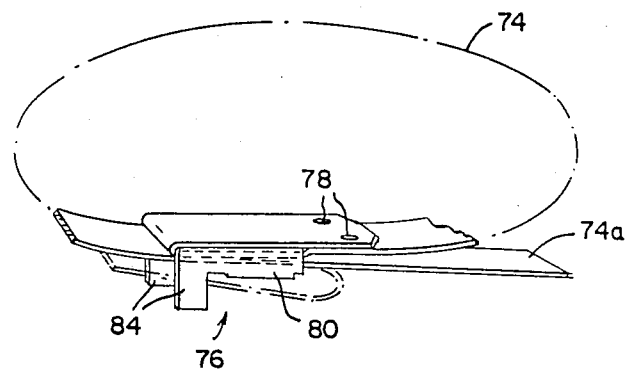
FIG. 5 is a partial perspective view of the improved clamp of FIG. 4, illustrating how the two ends of the clamp are joined together.

FIG. 4 illustrates a means for strapping cabling or other material to an elongated, hollow plate 70 having an upstanding, internally threaded socket 72 which is threaded onto the stud extension 20a of the coupling nuts previously described with respect to FIG. 1. The plate 70 has a hollow interior through which is run flexible strapping material 74, generally thin metal bands. Referring to FIG. 5, one end of the band 74 extends through the base of a buckle 76, is looped back underneath the buckle, and is welded to the band as illustrated at point 78. The free end 74a of the band is then looped around the cabling or other material 82 to be retained, extended through the loop 80 of the buckle as illustrated, thence back on itself and retained by flattening the upstanding ears 84 against the strap 74 and buckle 76. The free end of the strap is then cut. Use of this buckle and strapping technique saves a considerable amount of time in initially installing cabling, piping, or other materials.

If desired, the hangars illustrated in FIGS. 1–3 can be formed from tubular material as an integral unit with the saddle portion of the hangar flattened.

I claim:

1. A hanger assembly for supporting cabling, piping, or the like, comprising:
   a stud securable at one end to a support member, the opposite end of the stud including an externally threaded portion,
   an internally threaded socket securable to a clamp, and
   a coupling nut having (1) an internally threaded bore mating with the threads on the stud, and (2) an integral stud extension having external reverse threads mating with the internal threads of the internally threaded socket so that when the coupling nut is rotated to thread it onto the stud, the socket is simultaneously threaded onto the stud extension of the coupling nut.

2. The assembly of claim 1 wherein the internal threads on the coupling nut are spaced from the terminal end of the bore of the coupling nut to provide means for aligning the threads on the coupling nut with those of the stud, and wherein the internal threads on the socket are spaced from the terminal end thereof to align the threads on the socket with the threads on the stud extension of the coupling nut.

* * * * *